US008659431B2

(12) United States Patent
Brown

(10) Patent No.: US 8,659,431 B2
(45) Date of Patent: Feb. 25, 2014

(54) METHOD AND APPARATUS OF MONITORING AND UPDATING SECURITY PERSONNEL INFORMATION

(75) Inventor: Leola Brown, Columbia, SC (US)

(73) Assignee: Leola Brown, Columbia, SC (US)

( * ) Notice: Subject to any disclaimer, the term of this patent is extended or adjusted under 35 U.S.C. 154(b) by 241 days.

(21) Appl. No.: 12/659,587

(22) Filed: Mar. 15, 2010

(65) Prior Publication Data

US 2011/0221594 A1    Sep. 15, 2011

(51) Int. Cl.
*G08B 23/00*    (2006.01)
(52) U.S. Cl.
USPC ....... 340/573.1; 340/572.1; 340/5.1; 340/5.2; 340/5.21; 235/375; 235/385
(58) Field of Classification Search
USPC .............. 340/573.1, 5.86, 5.2, 5.61, 5.7, 5.8; 705/50, 73; 713/185
See application file for complete search history.

(56) References Cited

U.S. PATENT DOCUMENTS

| | | | | |
|---|---|---|---|---|
| 5,974,149 A * | 10/1999 | Leppek | ........................ | 713/164 |
| 6,088,720 A * | 7/2000 | Berkowitz et al. | ............ | 709/206 |
| 6,158,007 A * | 12/2000 | Moreh et al. | ....................... | 726/1 |
| 6,408,336 B1 * | 6/2002 | Schneider et al. | ............ | 709/229 |
| 6,735,701 B1 * | 5/2004 | Jacobson | .......................... | 726/1 |
| 7,164,439 B2 * | 1/2007 | Yoshida et al. | ............ | 348/226.1 |
| 7,380,279 B2 * | 5/2008 | Prokupets et al. | ............... | 726/27 |
| 7,852,196 B1 * | 12/2010 | Adams | ......................... | 340/5.86 |
| 2003/0128099 A1 * | 7/2003 | Cockerham | ..................... | 340/5.7 |
| 2005/0081045 A1 * | 4/2005 | Nicodemus et al. | .......... | 713/182 |
| 2005/0087596 A1 * | 4/2005 | Larson et al. | ................. | 235/382 |
| 2005/0280535 A1 * | 12/2005 | Gary, Jr. | ..................... | 340/572.1 |
| 2006/0026220 A1 * | 2/2006 | Margolus | ..................... | 707/204 |
| 2006/0064305 A1 * | 3/2006 | Alonso | ............................. | 705/1 |
| 2006/0080541 A1 * | 4/2006 | Monaco et al. | ............... | 713/182 |
| 2006/0208857 A1 * | 9/2006 | Wong | ........................... | 340/5.82 |
| 2006/0267773 A1 * | 11/2006 | Roque | ........................ | 340/572.7 |
| 2007/0038483 A1 * | 2/2007 | Wood | ............................... | 705/4 |
| 2008/0012703 A1 * | 1/2008 | Falavigna et al. | ............ | 340/540 |
| 2008/0208754 A1 * | 8/2008 | Zunke et al. | ..................... | 705/59 |
| 2008/0209506 A1 * | 8/2008 | Ghai et al. | ......................... | 726/1 |
| 2009/0076879 A1 * | 3/2009 | Sparks et al. | ..................... | 705/9 |
| 2010/0209006 A1 * | 8/2010 | Grigsby et al. | ............... | 382/218 |
| 2011/0313893 A1 * | 12/2011 | Weik, III | ......................... | 705/28 |

* cited by examiner

*Primary Examiner* — Benjamin C Lee
*Assistant Examiner* — Quang D Pham

(57) ABSTRACT

A method and apparatus of monitoring security personnel in a building facility is disclosed. One example method may include storing a plurality of information records associated with each of the security personnel in a database. The method may also include compiling, via a processor, a list of the information records that may be in violation of predetermined criteria used to determine whether the security personnel are in compliance with security procedures, and automatically notifying a security supervisor of the building facility of the security personnel that may be in violation of the security procedures. Such measures may reduce security violations and increase compliance with security measures and other safety concerns.

11 Claims, 13 Drawing Sheets

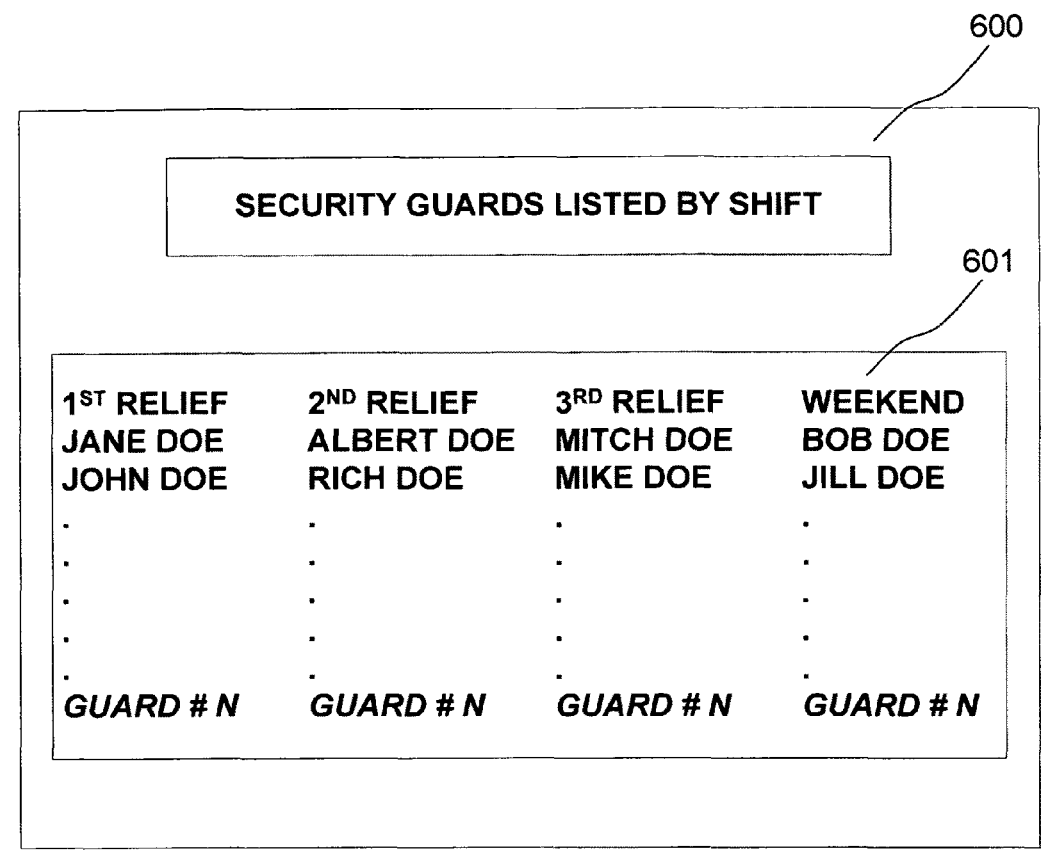

SECURITY GUARDS LISTED BY SHIFT

| 1ST RELIEF | 2ND RELIEF | 3RD RELIEF | WEEKEND |
|---|---|---|---|
| JANE DOE | ALBERT DOE | MITCH DOE | BOB DOE |
| JOHN DOE | RICH DOE | MIKE DOE | JILL DOE |
| . | . | . | . |
| . | . | . | . |
| . | . | . | . |
| . | . | . | . |
| *GUARD # N* | *GUARD # N* | *GUARD # N* | *GUARD # N* |

FIG. 6

| 701 | 702 | 703 | 704 | 705 | 706 | 707 | 708 |
|---|---|---|---|---|---|---|---|
| OFFICERS | CPR/FIRST AID | WEAPONS | COMPETENCY | HANDCUFF | PICTURE CARD | MASE | CERTIFICATION EXPIRATION ALERT |
| JOHN DOE | 11/1/2011 | 12/30/2010 | 3/5/2012 | 4/6/2010 | 5/7/2011 | 6/8/2012 | CERT. "X" EXPIRING 45 DAYS |
| JANE DOE | 9/12/2011 | 10/31/2010 | 3/5/2012 | 4/6/2010 | 5/7/2011 | 6/8/2012 | CERT. "Z" EXPIRING 31 DAYS |
| | | | | | | | |
| OFFICER "N" | | | | | | | |

OFFICER CREDENTIALS

OFFICER SCHEDULE

| OFFICERS 801 | SUN 802 | MON. | TUES. | WED. | THURS. | FRI. | SAT. | TOTAL HOURS 803 | HOUR VIOLATION! 804 |
|---|---|---|---|---|---|---|---|---|---|
| DATE | 8/31 | 9/1 | 9/2 | 9/3 | 9/4 | 9/5 | 9/6 | | |
| JOHN DOE | 9 | 9 | 9 | 9 | 0 | 0 | 9 | 45 | NO |
| JANE DOE | 16 | 0 | 0 | 0 | 0 | 16 | 0 | 32 | NO |
| OFFICER "N" | | | | | | | | | |

FIG. 8

FPS-10 Code Sheet

| Code | Meaning | Code | Meaning |
|---|---|---|---|
| 10-1 | Caution | 10-51 | Wrecker needed- |
| 10-2 | Signal | 10-52 | Ambulance needed |
| 10-3 | Stop transmitting | 10-53 | Road blocked |
| 10-4 | OK-Understood | 10-54 | Bldg. being evacuated |
| 10-5 | Relay-pass on | 10-55 | poss. DUI/DWI |
| 10-6 | Busy-stand by | 10-56 | intoxicated predestrian |
| 10-7 | Out of service | 10-57 | Hit & Run F, PI, PD |
| 10-8 | In-service | 10-58 | Direct Traffic TCP |
| 10-9 | Repeat/say again | 10-59 | Escort/Convey |
| 10-10 | Fight in progress | 10-60 | Car in vacinity |
| 10-11 | Investigate | 10-61 | Personnel in area |
| 10-12 | Standby/Stop | 10-62 | Reply to message Standby (stop) |
| 10-13 | weather report | 10-63 | Prepare- Weather/Road Report |
| 10-14 | Report of prowler | 10-64 | Message/local delivery/report/citation |
| 10-15 | Civil disturbance | 10-65 | Net message assignment (lookout) |
| 10-16 | Request supervisor here/at | 10-66 | Message cancellation |
| 10-17 | Meet complainant at | 10-67 | Clear read-message |
| 10-18 | Expedite assignment | 10-68 | Dispatch information |
| 10-19 | Return to station | 10-69 | Message received |
| 10-20 | Your location | 10-70 | Fire alarm |
| 10-21 | Land line/call | 10-71 | Advice nature of fire |
| 10-22 | Disregard last | 10-72 | Report progess of fire |
| 10-23 | Arrived on scene | 10-73 | Smoke report |
| 10-24 | Assignment completed | 10-74 | Negative / No |

FIG. 9

METHOD AND APPARATUS OF MONITORING AND UPDATING SECURITY PERSONNEL INFORMATION

TECHNICAL FIELD OF THE INVENTION

This invention relates to a method and apparatus of monitoring and tracking security personnel related information of security personnel working on-site to protect an agency, building and/or campus site. More particularly, this invention monitors the individual security guards and their present status during on-site working hours.

BACKGROUND OF THE INVENTION

Since the tragedy of the terrorist attacks of Sep. 11, 2001, the number of security personnel and security safeguards within any given company building, college university facility, government agency, etc., has increased exponentially.

Companies that train security guards offer trained security personnel on a contractual basis and monitor those security guards during the contract period. Such an ongoing monitoring procedure is a complicated and tedious task. For example, ensuring that the security staff personnel have received the proper training certifications, updated their certifications, have kept their criminal record clean outside of work, etc., are all areas that require constant monitoring.

The security companies face large monetary penalties for providing staff to sites when the individuals are in violation of their needed certifications and/or are not free from legal violations. An even larger challenge arises from maintaining the proper number of individual security guards on a particular site at any given moment. For instance, if a security guard shows up to work with an expired gun certification, but the site is short a guard for the west entrance, the priority will likely be to place the guard at his or her post and address the expired gun certification at a later time.

Hiring security staff, and, subsequently training the staff, re-training the staff, keeping records of the staff is an ongoing process that is necessary to protect the facility that is being guarded. In addition, further measures are required to ensure the safety of the security staff personnel themselves.

BRIEF DESCRIPTION OF THE DRAWINGS

FIGS. 6-11 illustrate example screenshots of a security program interface based on the options illustrated in FIG. 5, according to example embodiments of the present invention.

SUMMARY OF THE INVENTION

Figure 1:
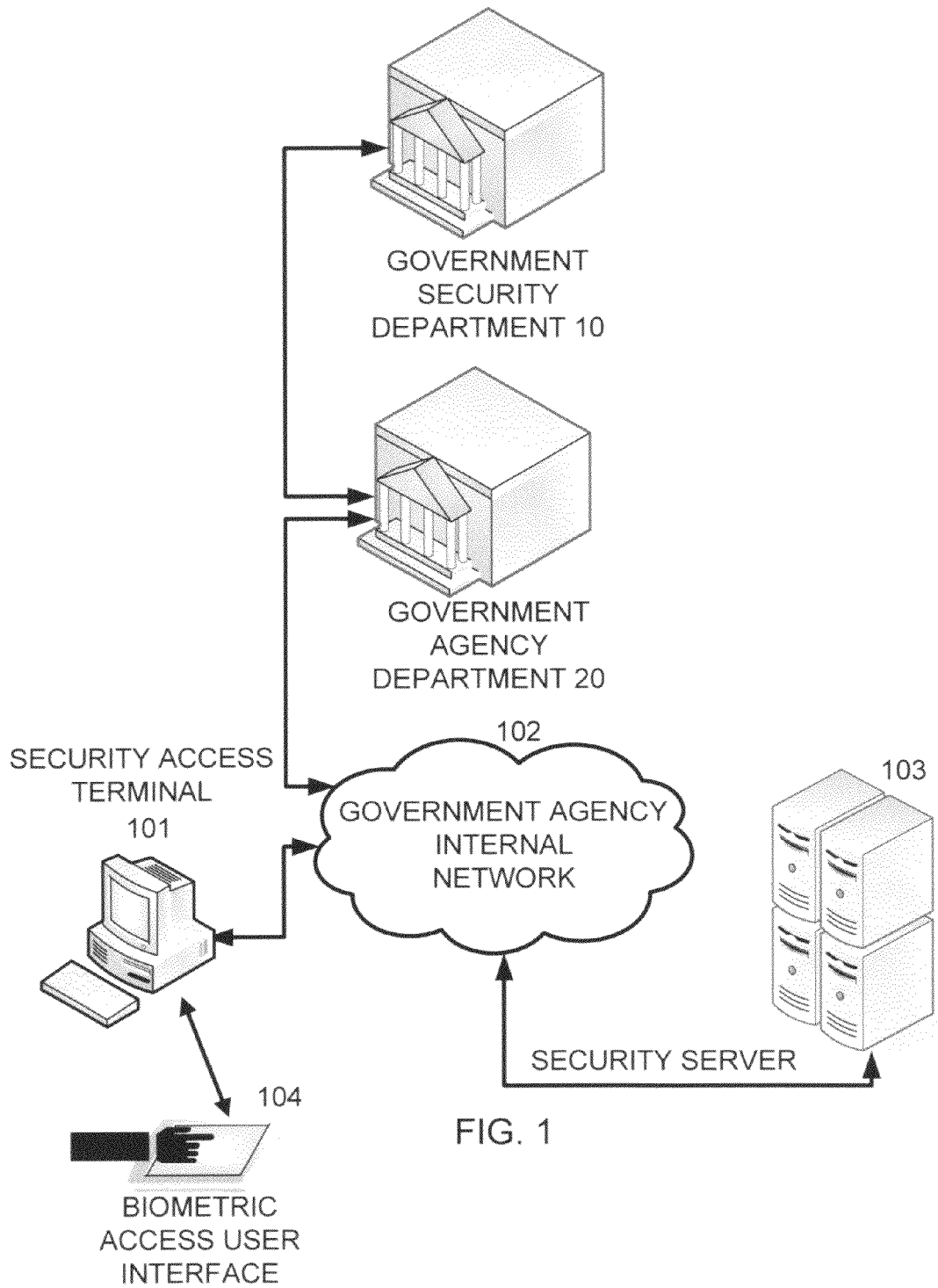
FIG. 1 illustrates an example network configuration of the inter-agency and internal network communication networks, according to example embodiments of the present invention.

Example embodiments of the present invention may include a method of monitoring security personnel in a building facility. The method may include storing a plurality of information records associated with each of the security personnel in a database. The method may also include compiling, via a processor, a list of the information records that may be in violation of predetermined criteria used to determine whether the security personnel are in compliance with security procedures. The method may further include automatically notifying a security supervisor of the building facility of the security personnel that may be in violation of the security procedures.

Example embodiments of the present invention may also include an apparatus configured to monitor security personnel in a building facility. The apparatus may include a memory configured to store a plurality of information records associated with each of the security personnel in a database. The apparatus may also include a processor configured to compile a list of the information records that may be in violation of predetermined criteria used to determine whether the security personnel are in compliance with security procedures, and a transmitter configured to automatically send a message to notify a security supervisor of the building facility of the security personnel that may be in violation of the security procedures.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

FIG. 1 illustrates an example communication system hierarchy of security management according to an example embodiment of the present invention. Referring to FIG. 1, the government security department 10 may represent an agency that is in charge of security for an entire portion of the federal or state government (e.g., homeland security, intelligence agencies, state security agencies, etc.). The government security agency may be directly linked to each individual government agency department 20. In this example, only one government agency department 20 is illustrated, for example purposes, however, many agencies exist under the supervision of a government security agency 10 designated to provide security to such agencies.

Within every government agency department 20 is an internal government agency network 102 that is the backbone for the security system in place at each government agency facility 20. For example, agencies, such as, the U.S. Treasury, the U.S. Patent and Trademark Office, the U.S. department of Tobacco and Firearms, etc. are all agencies that would have their own security data system for user authorization and other related features.

An internal government agency security network 102 may include such features as a server or database 103 that stores the security software that may be accessible by each security access terminal 101. In operation, a security access terminal 101 may be a location where building personnel are authorized to enter a building. In addition to the building personnel are the security officers which also have access to the building. The most common ways to receive access to a building are through a user identification process, which usually involves a user swiping his or her badge at a badge reader interface coupled to a security access terminal 101.

Other options for user authorization are accessible via biometric access user interfaces 104, which include fingerprint scanning, retina scanning, face scanning, voice recognition and other computer-based authorization procedures used to ensure that users are authorized to enter a secure building facility. Regardless of the user authorization hardware and/or related procedure used to allow user access to a building facility, the input information will be verified via pre-stored data stored in the security server 103. Assuming the user's input information has been saved in the security server 103, the user's input information should provide a match and allow the user to receive access to the building facility via the security personnel.

Figure 2A:
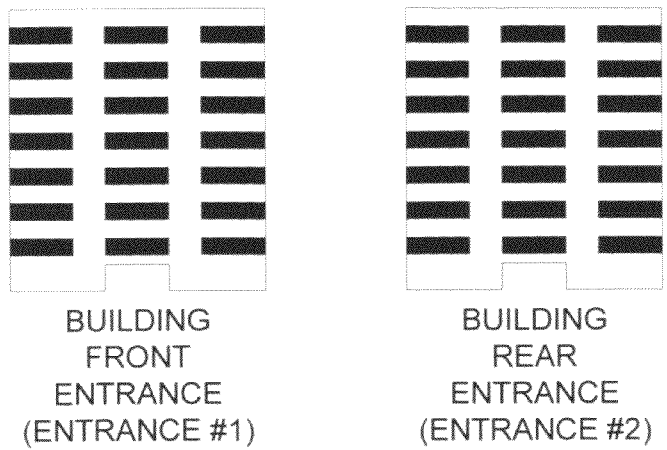
FIG. 2A illustrates an example agency building, according to example embodiments of the present invention.
Figure 2B:
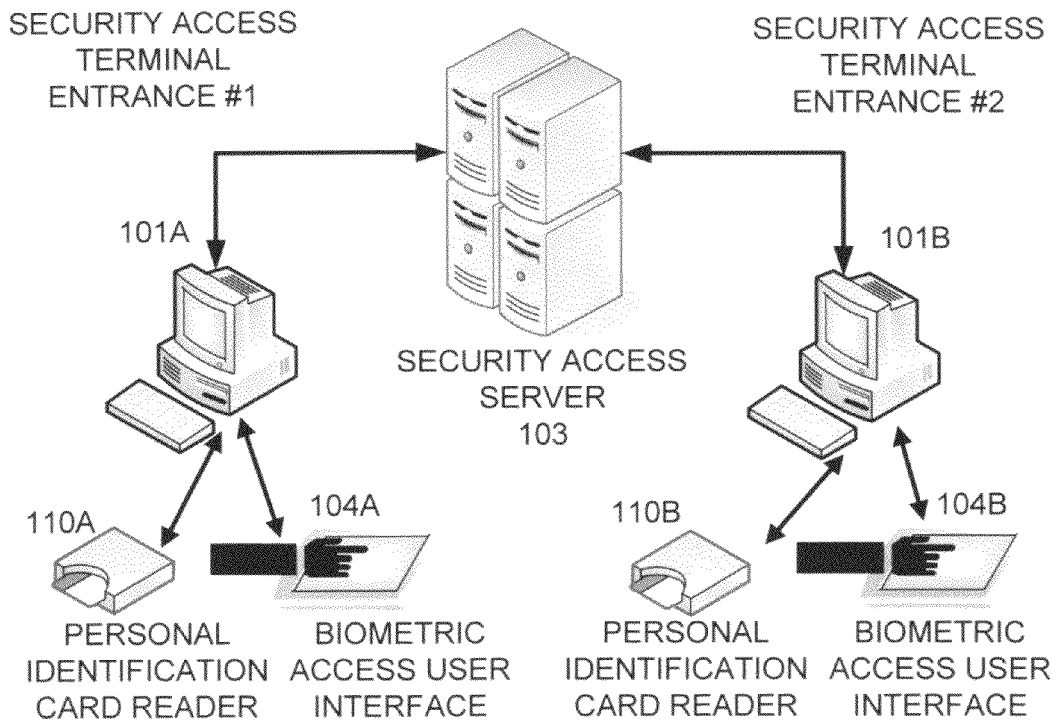
FIG. 2B illustrates an example network configuration of an internal agency network and security interface for agency personnel, according to example embodiments of the present invention.

A security system that may be operated in a single agency or facility is illustrated in FIGS. 2A and 2B, according to example embodiments of the present invention. Referring to FIG. 2A, an example building is illustrated to show that a building is likely to have more than one entrance. In this example, there are two entrances, a front entrance and a rear entrance. Such a dual entrance approach is common in many government agencies. Generally, certain personnel will frequent the front entrance, while other personnel will only use the rear entrance (high-level building officials, security officer personnel, etc.).

FIG. 2B illustrates an example security computer network, according to example embodiments of the present invention. Referring to FIG. 2B, each of the security entrances and 2 are illustrated as having respective security access terminals 101A and 101B. Such security access terminals 101A and 101B are used to provide access to end user security hardware interfaces, such as, biometric access terminals 104A and 104B and/or personal identification card readers 110A and 110B. In order to verify user information that is inputted through the user input security access terminals 101A and 101B, a central security access terminal 103 is used to verify that the user input information matches a pre-stored record of a user's badge data and/or biometric input data.

When implementing a security agency computer system, such a security system should be setup in a secure manner that is separate from the other computer networking components of the agency building. For example, a central server security access terminal 103 and corresponding security access terminals 101A and 101B may be interconnected and setup to communicate with one another. Once the network administrator inputs the authorized security officer information into the system and stores that information onto the server security access terminal 103, the additional security access entrances 101A and 101B may be setup with security access terminals that can access the information from the central server 103.

Figure 3:
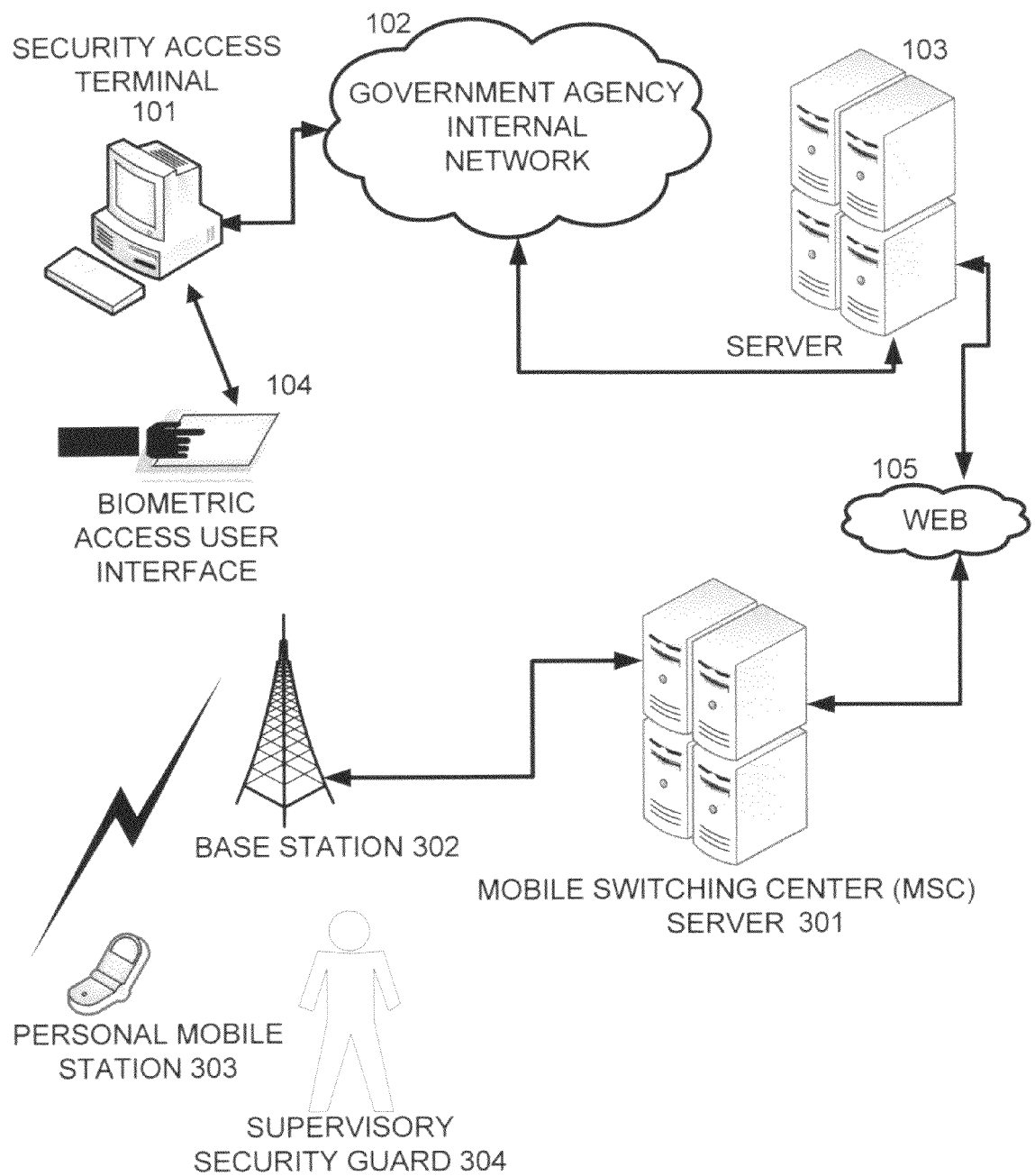
FIG. 3 illustrates an example network configuration of an internal agency network and security interface for agency personnel and a wireless communication network, according to example embodiments of the present invention.
Figure 4:
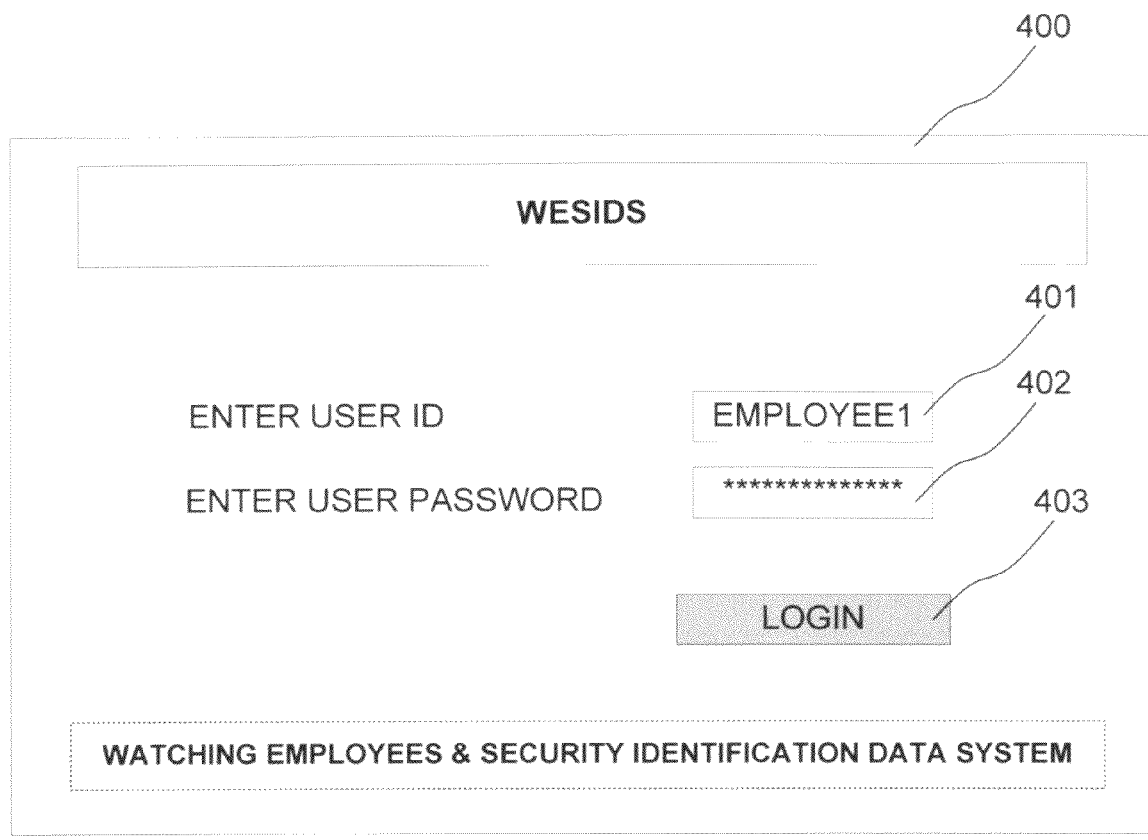
FIG. 4 illustrates an example screenshot of a security interface for agency personnel, according to example embodiments of the present invention.

FIG. 3 illustrates an example government agency internal network 102 and corresponding devices, 101, 103 and 104 that are connected to an external network (i.e., web 105), which may be another secure network to another government agency and/or the Internet. Such a connection would be a secure connection that uses digital certificates and/or encryption algorithms to keep the content on the internal network 102 secure from intrusion.

Referring to FIG. 3, if a security breach and/or urgent security update measure were to occur on the internal security network 102, then measures may be taken to notify supervisory security officers, such as, security site captains, lieutenants, and/or other security personnel that are responsible for enforcing such security concerns. As illustrated in FIG. 3, a mobile switching center (MSC) server 301 is illustrated as being connectively coupled to the web 105. In this example, an urgent and/or important message may be identified on the internal agency network 102 and may be securely forwarded along to the external MSC server 301.

The urgent message may be communicated to a corresponding base station 302 that is in communication with a mobile station 303 that is being used by a supervisory security officer guard 304. This provides a secure mechanism to forward internal security alerts through an external network (mobile communications network) to a device operated by a supervisor in charge at the same government agency internal network 102. The alert may be provided in the form of a phone call, a direct voice message or voice alert, a text message and/or an email alert.

An example of an urgent message may be a security breach and/or breach alert identifying a situation that is not authorized. For example, security personnel records may be maintained to identify the security personnel, and to determine whether the security and/or employee personnel require any special considerations due to personal problems. For instance, the security guard and/or employee may be having domestic problems with their cohabitant or spouse and may alert the network administrator that their spouse has been court ordered not to contact the security guard and/or employee at all. Such an alert may be identified in the system as a high alert, which may place a red lining around the guards photograph when accessed by any of the other guards present at a computer access terminal. When a visitor off the street walks into the building, the security desk guards will inquire about his or her intentions and identify the person they are seeking to visit. Once the identified security guard employee is accessed via the computer records, the alert would accompany that employee's record and the visitor would be denied access by the security desk guards.

In another example, the mere accessing of the at-risk employee's records would trigger an alert that may be automatically forwarded to the mobile station of the site security supervisor so he or she would automatically be informed of the instance of a visitor attempting to visit the at-risk employee. The site supervisor then could plan accordingly in the event that the visitor becomes unpleasant or the visitor resists the security guards attempts at being turned away. By providing preventative alert measures, the guards are capable of defending themselves more efficiently in the event that a situation escalates to violence in the building.

One method to maintain accurate records of the access and use of the computer system is to create and log a record of each time a user accesses any of the security access terminals 101 or security servers 103. For example, assuming a security network administrator logs onto the system and performs any of the various administrator operations, such a log will be made to capture the event (feature performed), the user name of the individual, the computer name of the actual terminal used to access the system, the date and time along with other pertinent record information. Such a logging data storage operation ensures accurate records are kept of the user's access to the security system, and that such data records are stored in the server 103 for later access.

When configuring a security access system, such as, the system illustrated in FIG. 2B, the computers and other related network devices should be identified by a central database verification operation that is stored in the security access server 103. One example may include identifying the hardware profiles of the network computing devices, such as, identifying the MAC address of the network interface cards, and/or identifying the computers by CPU, pre-stored memory configurations and/or other data that may be used to pre-authorize the devices prior to allowing them to communicate with the security server 103. Such a security measure maintains accurate records of the devices that are allowed to access the network and the corresponding security settings.

Setting up a secure-site communication networking system requires certain procedures to ensure the security personnel are properly accounted for and observed by the records stored in the central server 103. According to example embodiments of the present invention, it may be necessary to first establish three folders for the records stored in the server 103, which may be identified as photos, fingerprints and signatures. The security officer personnel may then be profiled by their picture and their corresponding biometric fingerprints and personal signatures when necessary.

Once those preliminary folders are created, it is necessary to create a user profile for a new user. The profile may be a user name or identifier (ID) 401 and password 402, as illustrated in the login screen of the "watching employee & security identification data system" (WESIDS) 400. Once the information has been entered, the user may click on the login button 403 to access the security system.

Figure 5:
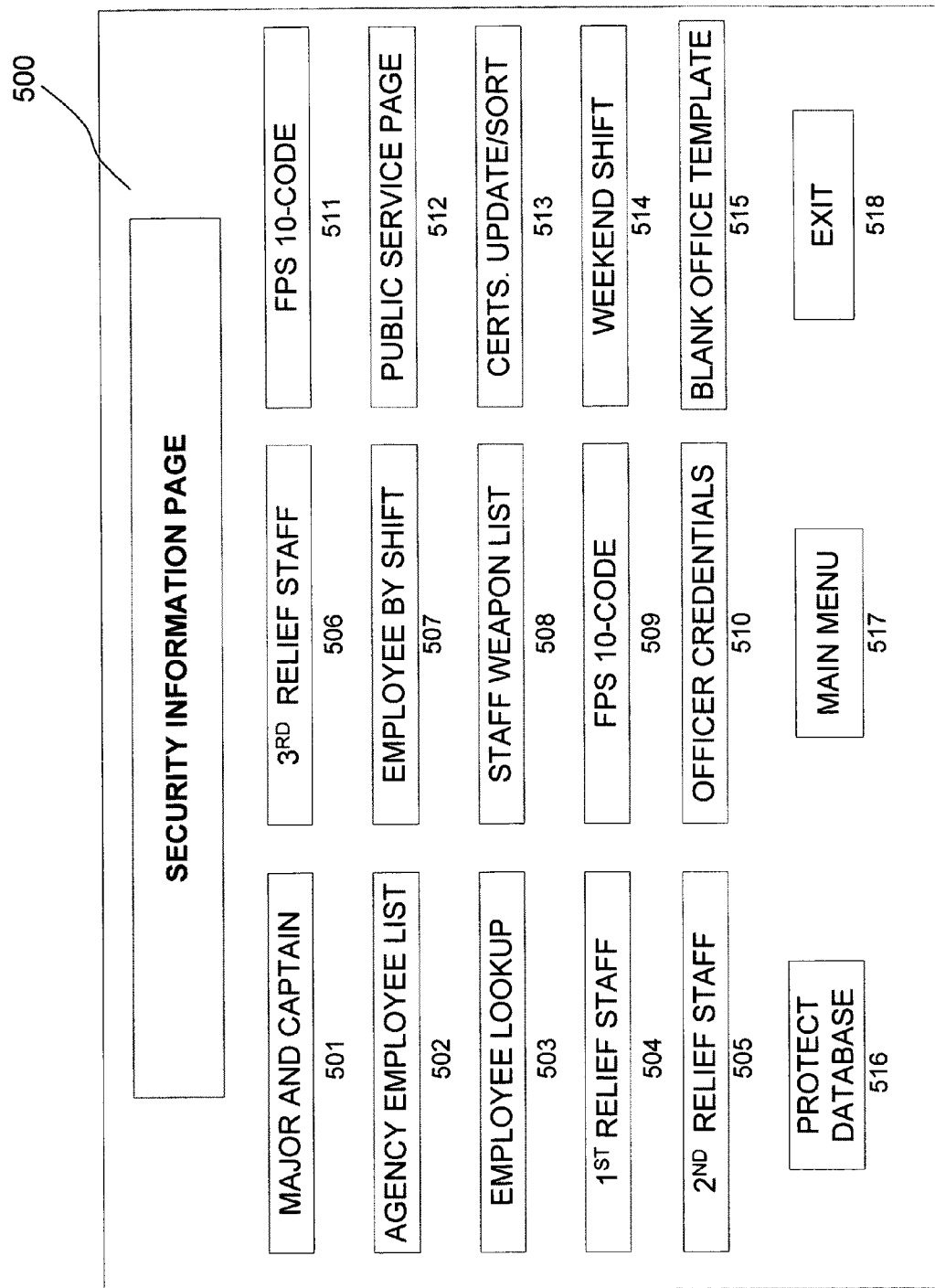
FIG. 5 illustrates another example screenshot of a security program interface for agency personnel, according to example embodiments of the present invention.

The main page of the security information system includes many buttons and options to view all of the security features associated with a security site. Referring to FIG. 5, a security information page 500 includes various buttons and options providing access to the common types of security concerns and information that are not normally accessible via a single screen shot. For example, button 501 illustrates a major and captain button that provides detailed information of the major and captain of the security site who are currently on duty. A security agency that is in charge of a lower-level government agency could easily be linked to this screen so that access is available to the currently present major and/or captain in charge of the facility.

Such updated information may be automatically populated into the security information page by the pre-stored image and personal information of the major and captain and their assigned schedules for the present day. By having the schedule information populate the major and captain buttons, an accurate list of information will be available for the site managers and higher level government agencies to view and contact those supervisory individuals as necessary.

Referring to FIG. 5, an agency employee list 502 provides a complete list of all employees currently employed to guard a particular site. Such a list may be cross-referenced with any of the other buttons to provide easy to navigate buttons to pull-up information about a particular user. An employee lookup 503 may be used to quickly reference a particular employee and his or her present credentials and certifications.

The security guards may be identified by their particular shift by clicking button 507, and/or by the particular shifts, such as, first relief staff, second relief staff and third relief staff 504-506. The various reliefs represent the 24 hours of the day broken up into three separate shifts. The employee by shift button contents are illustrated in the screen shot 600 of FIG. 6, according to example embodiments of the present invention. Referring to FIG. 6, the first, second, third reliefs 504-506 and weekend shift employees 514 are all listed for convenience 601. This view may provide a supervisor with an opportunity to identify an employee that has not been up-to-date with their present certifications. For example, one of the names may be bolded or red to illustrate that the employee is in violation of one or more of the rules or regulations of their contractual employment. Such a violation may be based on a cross-reference to one of the other buttons or tabs included in the security information page, such as, officer credentials 510. Similar examples are disclosed in detail below.

Other buttons form the security information page may include a staff weapon list 508, which identifies the weapon type and serial number of the weapon that the security guards are currently carrying in the building facility. The FPS 10-Code list 511 may provide easy access to common security codes used to communicate between security guards. The public service page 512 provides access to nearby services, such as, fire, police, bomb squads and other likely services to be called by a security guard. The officer's certifications may be viewed and sorted by the options present at the certs. update/sort button 513. Additional officers may be added by clicking on the blank office template 515 to initiate a new profile. Further features may include a protect database 516 option to lock the access to the database from any of the security personnel, a main menu return button 517 and an exit button 518 to exit the information page.

FIG. 7 illustrates the officer credentials from button 510 of FIG. 5. The officer credentials 510 may include certain fields, such as, officer name 701, officer credentials 702-707 (CPR/first aid, weapons training, competency screening, handcuff training, updated picture card and spray can mase training), and one or more certification expiration alert fields 708, which are linked to the officer credential expiration dates. For example, certifications that enter a 90 day window of expiration may create an alert for field 708.

The alert field may begin by identifying a particular certification that will expire in 90 days based on the date information provided in that certification field. Since the certification take days and sometimes weeks to schedule, and additional days or weeks to send a confirmation of successful completion, it is important to start viewing expiring credentials for a security officer at around 90 days from the expiration date.

Upon an alert being noted by the officer credential database file or spreadsheet, the officers in charge of the facility (project manager, assistant project manager, lieutenant, etc.) will be notified via the messaging system of FIG. 2 (i.e. phone call, email, text message, etc.). This provides an automated way to stay on top of the officers credentials and to reduce the likelihood of fines or safety concerns that could be hazardous to human lives (forgotten CPR procedures at a moment of crisis, etc.).

Higher level security agencies may also login via a secure connection and view the site captain and/or major by the button 501 along with a daily report of the security personnel credentials. Such a report may be automatically emailed to the higher level security agency supervisor to monitor all the government agencies by knowing which individual security officers are in compliance with their regulations and certifications.

FIG. 8 illustrates the officers payroll and work schedule information 800, according to an example embodiment of the present invention. Referring to FIG. 8, an officer name 801 is used to illustrate a database or spreadsheet entry in the security management system. The days of the week Sun-Sat are denoted by 802 and are matched with a particular calendar date and a user's scheduled working hours the same day. The total hours for the week are illustrated in field 803 and a predetermined hour violation criteria scheme 804 may be programmed to notify the site managers if a particular security officer is working too many hours in a given week, bi-week or month. This also provides an easy way to make the schedule with an automated hour violation procedure reminding the administrator if too many hours have been scheduled for a particular user.

The FPS-10 code button 509 may provide easy access to the common security codes used to communicate via oral communication between security guards. Examples of such codes 10-1 through 10-74 are illustrated in screenshot 900 of FIG. 9. Easy access to important information that is used daily for security officers is easy to integrate into the main security information page.

Figure 10:
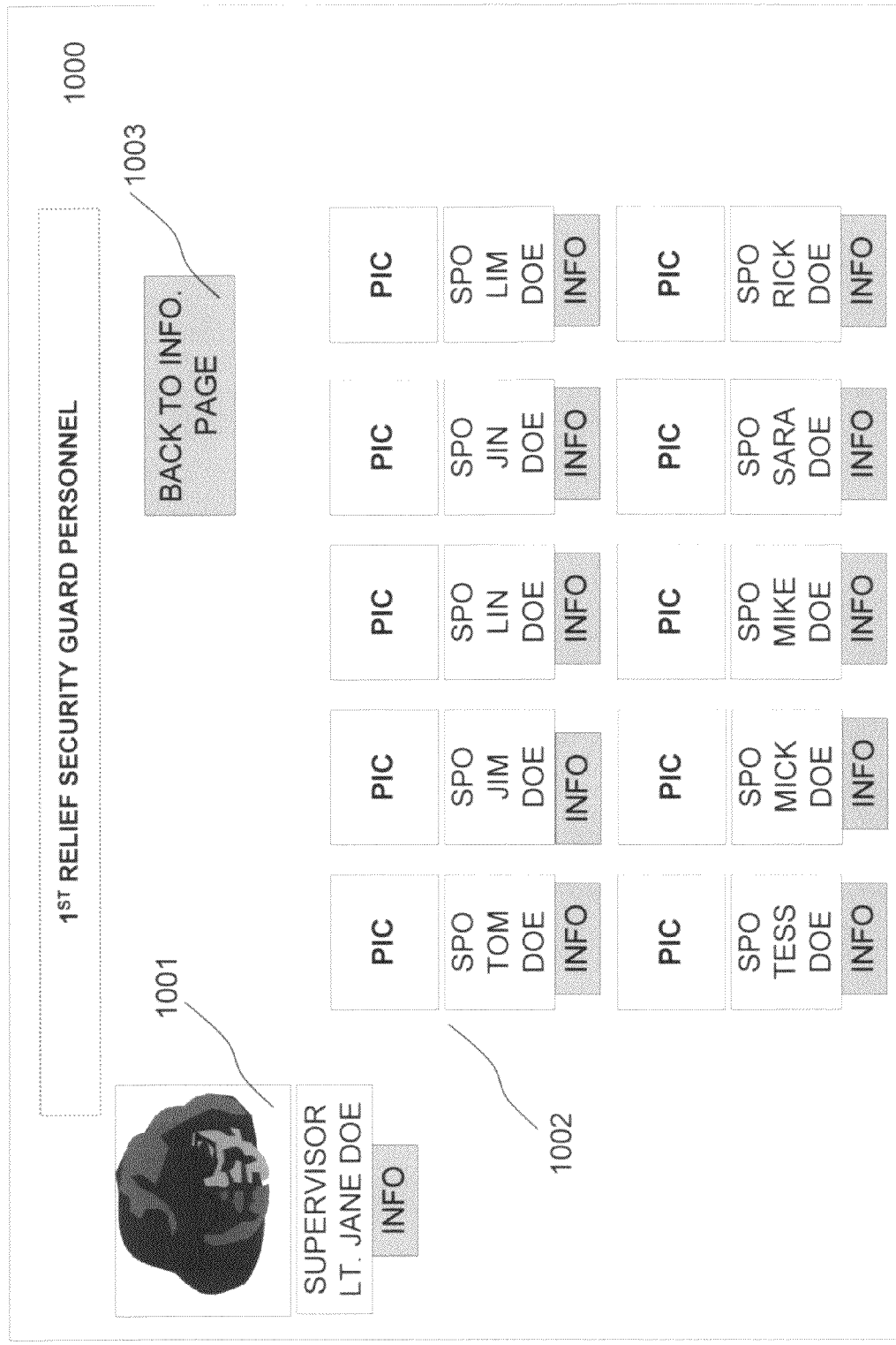

FIG. 10 illustrates a site personnel photo and information gallery for a 1$^{st}$ relief security guard personnel list of individuals 1000, according to an example embodiment of the present invention. Referring to FIG. 10, assuming the 1$^{st}$ relief staff 504 has been selected by the user, a snapshot of the security officers and the on-duty supervisor 1001 for that shift are pictured for convenience and clarity. The other security officers (SPOs) are also listed 1002. The "info" tabs provide access to the officers' personal information. 1003 provides a button to return back to the main information page.

If an officer is currently in violation of a security credential or has violated the local government law and is effectively suspended from his or her position as a security guard, then that officer's picture may be identified by a red border around the frame of the picture. Such a red flag may be automatically created based on any of the fields in violation from the officers total hours scheduled, certifications, and/or personal record information (i.e., criminal record). This provides the site manager with an easy way to view all of the security officers and identify those who must be confronted immediately.

Figure 11:
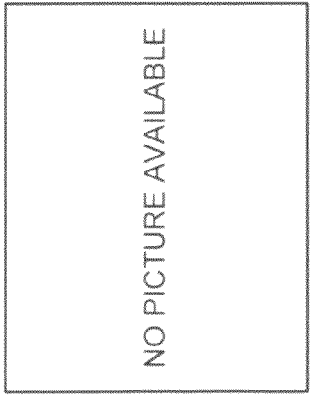

FIG. 11 illustrates the example information 1100 that may be observed when a user's "info" tab is selected, according to example embodiments of the present invention. Referring to FIG. 11, the user's personal information 1101 is arranged for safety purposes, such as, address, telephone number, birth date, SPO credential certification, site where working, spouse's name, emergency contact information, etc. Also, a snapshot from the user's credential information 1102 may be provided for a simple view as to whether the user's credentials are up-to-date or have been expired.

One example method may include a method of monitoring security personnel in a building facility. The method includes storing a plurality of information records associated with each of the security personnel in a database, at operation 1301. The method may also include compiling, via a processor, a list of the information records that may be in violation of predetermined criteria used to determine whether the security personnel are in compliance with security procedures, at operation 1302. The method may further include automatically notifying a security supervisor of the building facility of the security personnel that may be in violation of the security procedures, at operation 1303.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 12 illustrates an example network element 1200, which may represent any of the above-described network components 101, 102, 103, 105, 301, 302, and 303.

Figure 12:
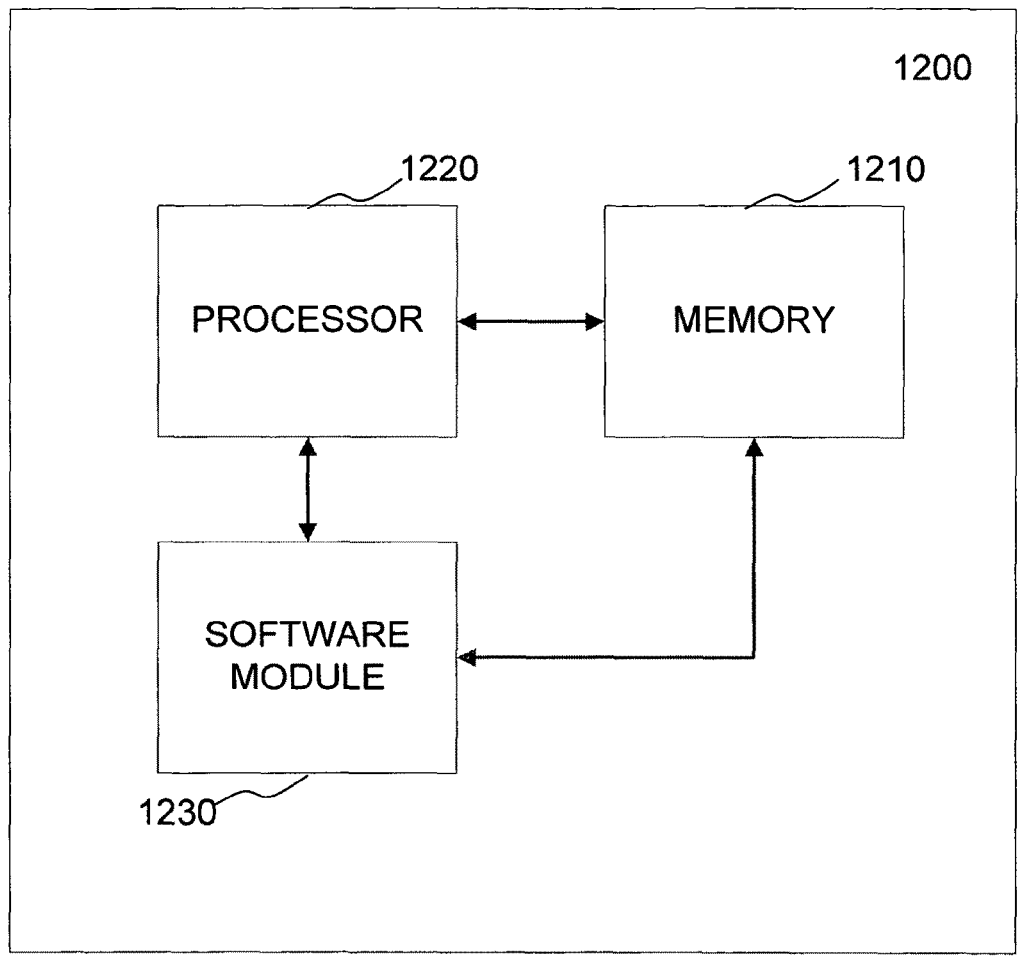
FIG. 12 illustrates an example network entity configured to perform the example embodiments of the present invention.
Figure 13:
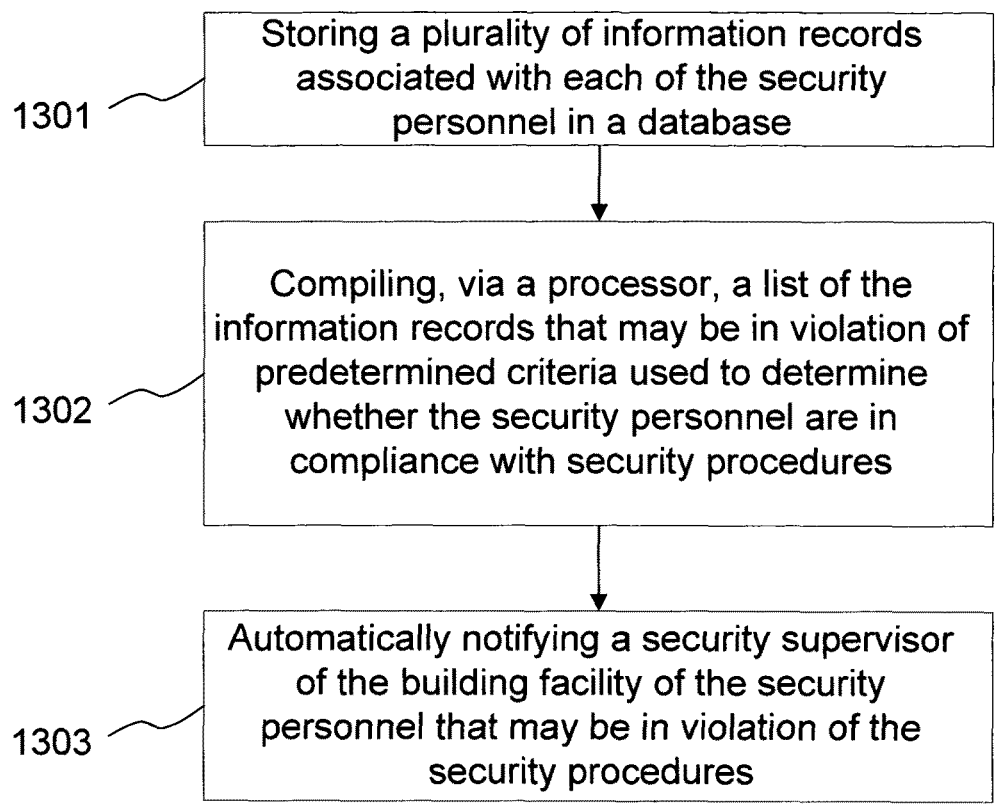
FIG. 13 illustrates an example method according to example embodiments of the present invention.

As illustrated in FIG. 12, a memory 1210 and a processor 1220 may be discrete components of the network entity 1200 that are used to execute an application or set of operations. The application may be coded in software in a computer language understood by the processor 1220, and stored in a computer readable medium, such as, the memory 1210. Furthermore, a software module 1230 may be another discrete entity that is part of the network entity 1200, and which contains software instructions that may be executed by the processor 1220. In addition to the above noted components of the network entity 1200, the network entity 1200 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:
1. A method of monitoring security personnel in a building facility, the method comprising:
storing a plurality of information records associated with each of the security personnel in a database, the information records identifying the security personnel as a plurality of security guards, each having a unique user identification, a work schedule of times each security personnel individual is scheduled to be working as a security guard at the building facility, and a plurality of security personnel credentials that have a finite certification period;

receiving at least one user identification input data via a security access terminal and authenticating the at least one user identification input data as a known security personnel individual based on a pre-stored record associated with that particular security personnel individual in the database before allowing the security personnel individual to receive access to the building facility;

identifying at least one of the plurality of security personnel currently scheduled to be working as a security supervisor and designating the security supervisor as a recipient of security violations and urgent messages;

compiling, via a processor, a list of the plurality of information records on a daily basis that are in violation of one or more of the plurality of security personnel credentials used to determine whether the security personnel are in compliance with security procedures, the compiling operation comprising identifying each of the plurality security personnel credentials for each of the security personnel that are currently scheduled to be working that particular day and identifying at least one security personnel credential of at least one of the security personnel that is at least one of expiring and near a predetermined time period of expiring, and which is in violation of the security procedures; and automatically notifying the security supervisor of the building facility, by identifying the security supervisor from the database as the recipient of the security violations and urgent messages, of the at least one of security personnel currently scheduled to work as the security guard at the building facility that particular day and that is in violation of the security procedures due to the at least one security personnel credential violation by sending a message to the security supervisor via at least one of a call to the supervisor's mobile station, a text message to the supervisor's mobile station, and an e-mail message to the supervisor's mobile station, and wherein the credential violation comprises at least one of an expiring weapons certification renewal date, mase combat training renewal date, first aid renewal date, security training renewal date, a total number of hours worked being exceeded a predetermined hour violation criteria, and handcuff training renewal date.

2. The method of claim 1, wherein the notifying operation is performed once a day to identify the security personnel that need to be reminded to update their credentials to comply with the security procedures.

3. The method of claim 1, wherein the credential violation further comprises an expired picture card renewal date.

4. The method of claim 1, further comprising:
automatically notifying the security supervisor of the building facility when an at-risk security personnel individual's profile information has been accessed from the database.

5. The method of claim 1, further comprising:
sending a remote notification to a security agency that monitors the building facility once a day to identify the security personnel that need to be reminded to update their credentials to comply with the security procedures.

6. An apparatus configured to monitor security personnel in a building facility, the apparatus comprising:
a memory configured to store a plurality of information records associated with each of the security personnel in a database, the information records identifying the security personnel as a plurality of security guards, each having a unique user identification, a work schedule of times each security personnel individual is scheduled to be working as a security guard at the building facility, and a plurality of security personnel credentials that have a finite certification period;

a receiver configured to receive at least one user identification input data via a security access terminal and authenticate the at least one user identification input data as a known security personnel individual based on a pre-stored record associated with that particular security personnel individual in the database before allowing the security personnel individual to receive access to the building facility, and identify at least one of the plurality of security personnel currently scheduled to be working as a security supervisor and designating the security supervisor as a recipient of security violations and urgent messages;

a processor configured to compile a list of the plurality of information records on a daily basis that is in violation of one or more of the plurality of security personnel credentials used to determine whether the security personnel are in compliance with security procedures, the compile operation causing the processor to identify each of the plurality security personnel credentials for each of the security personnel that are currently scheduled to be working that particular day and identifying at least one security personnel credential of at least one of the security personnel that is at least one of expiring and near a predetermined time period of expiring, and which is in violation of the security procedures; and a transmitter configured to automatically send a message to notify the security supervisor of the building facility, by identifying the security supervisor from the database as the recipient of the security violations and urgent messages, of the at least one of security personnel currently scheduled to work as the security guard at the building facility that are in violation of the security procedures due to at least one security personnel credential violation, wherein the message is sent to the security supervisor via at least one of a call to the supervisor's mobile station, a text message to the supervisor's mobile station, and an e-mail message to the supervisor's mobile station, and wherein the credential violation comprises at least one of an expiring weapons certification renewal date, mase combat training renewal date, first aid renewal date, security training renewal date, a total number of hours worked being exceeded a predetermined hour violation criteria, and handcuff training renewal date.

7. The apparatus of claim 6, wherein the notifying operation is performed once a day to identify the security personnel that need to be reminded to update their credentials to comply with the security procedures.

8. The apparatus of claim 6, wherein the credential violation further comprises an expiration of a picture card renewal date.

9. The apparatus of claim 6, wherein the transmitter is further configured to automatically notify the security supervisor of the building facility when an at-risk security personnel individual's profile information has been accessed from the memory.

10. The apparatus of claim 6, wherein the transmitter is further configured to transmit a remote notification to a security agency that monitors the building facility once a day to identify the security personnel that need to be reminded to update their credentials to comply with the security procedures.

11. A non-transitory computer readable storage medium configured to store a computer program that when executed causes a processor to perform monitoring security personnel in a building facility, the processor being further configured to perform:
storing a plurality of information records associated with each of the security personnel in a database, the information records identifying the security personnel as a plurality of security guards, each having a unique user identification, a work schedule of times each security personnel individual is scheduled to be working as a security guard at the building facility, and a plurality of security personnel credentials that have a finite certification period;
receiving at least one user identification input data via a security access terminal and authenticating the at least one user identification input data as a known security personnel individual based on a pre-stored record associated with that particular security personnel individual in the database before allowing the security personnel individual to receive access to the building facility;
identifying at least one of the plurality of security personnel currently scheduled to be working as a security supervisor and designating the security supervisor as a recipient of security violations and urgent messages;
compiling, via a processor, a list of the plurality of information records on a daily basis that are in violation of one or more of the plurality of security personnel credentials used to determine whether the security personnel are in compliance with security procedures, the compiling operation comprising identifying each of the plurality security personnel credentials for each of the security personnel that are currently scheduled to be working that particular day and identifying at least one security personnel credential of at least one of the security personnel that is at least one of expiring and near a predetermined time period of expiring, and which is in violation of the security procedures; and
automatically notifying the security supervisor of the building facility, by identifying the security supervisor from the database as the recipient of the security violations and urgent messages, of the at least one of security personnel currently scheduled to work as the security guard at the building facility that particular day and that is in violation of the security procedures due to the at least one security personnel credential violation by sending a message to the security supervisor via at least one of a call to the supervisor's mobile station, a text message to the supervisor's mobile station, and an e-mail message to the supervisor's mobile station, and
wherein the credential violation comprises at least one of an expiring weapons certification renewal date, mase combat training renewal date, first aid renewal date, security training renewal date, a total number of hours worked being exceeded a predetermined hour violation criteria, and handcuff training renewal date.

* * * * *